United States Patent
Valle

(10) Patent No.: US 7,013,753 B2
(45) Date of Patent: *Mar. 21, 2006

(54) BICYCLE CRANK AND METHOD FOR MANUFACTURING SAID CRANK

(75) Inventor: Maurizio Valle, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 10/174,636

(22) Filed: Jun. 19, 2002

(65) Prior Publication Data

US 2003/0019324 A1 Jan. 30, 2003

(30) Foreign Application Priority Data

Jun. 27, 2001 (IT) ............................ TO2001A0617

(51) Int. Cl.
*G05G 1/14* (2006.01)

(52) U.S. Cl. ...................................................... 74/594.1

(58) Field of Classification Search ............... 74/594.1, 74/594.2, 594.3; 29/527.6, 557, 527.2, 423, 29/424

See application file for complete search history.

(56) References Cited

U.S. PATENT DOCUMENTS

| | | | | |
|---|---|---|---|---|
| 3,138,856 A | | 6/1964 | Kuchek ........................ 29/423 |
| 4,171,822 A | * | 10/1979 | Thun ........................... 280/259 |
| 4,811,626 A | | 3/1989 | Bezin | |
| 4,841,801 A | | 6/1989 | Tice ........................... 74/573 R |
| 5,010,785 A | | 4/1991 | Romero ........................ 74/594.1 |
| 5,435,869 A | | 7/1995 | Christensen .................. 156/175 |
| 5,690,034 A | * | 11/1997 | Schahl et al. ............. 105/199.1 |
| 5,851,459 A | | 12/1998 | Chen ........................... 264/46.7 |
| 5,941,135 A | * | 8/1999 | Schlanger .................... 74/594.1 |
| 6,145,184 A | * | 11/2000 | Yamanaka .................. 29/527.6 |
| 6,202,506 B1 | | 3/2001 | Storck et al. .............. 74/594.1 |
| 6,305,243 B1 | | 10/2001 | Chiang ........................ 74/394.1 |

FOREIGN PATENT DOCUMENTS

| | | |
|---|---|---|
| EP | 0270388 A1 | 6/1988 |
| EP | 0850826 A2 | 7/1998 |
| EP | 19755950 A1 | 6/1999 |
| FR | 2636386 | 9/1988 |
| JP | 06321167 | 11/1994 |
| TW | 390330 | 5/2000 |
| TW | 448114 | 8/2001 |
| WO | WO9857840 | 12/1998 |

OTHER PUBLICATIONS

E. Heitz, Faserverstärkte Verbundwerkstoffe im Freizeitgerät, Aug. 1996, pp. 646-651.

* cited by examiner

*Primary Examiner*—Vicky A. Johnson
(74) *Attorney, Agent, or Firm*—Volpe and Koenig, P.C.

(57) ABSTRACT

A bicycle crank is provided comprising an elongated core with a first and second end, a first and second insert are arranged at the ends of the core and a high-resistance coating of fibers incorporated in a plastic matrix material forms a coating for the core and inserts. The core is a preformed element and each insert is connected to the respective end of the core by a union element having recesses to establish a shape coupling with an insert and the respective end portion of the core.

25 Claims, 3 Drawing Sheets

BICYCLE CRANK AND METHOD FOR MANUFACTURING SAID CRANK

BACKGROUND

Figure 2:
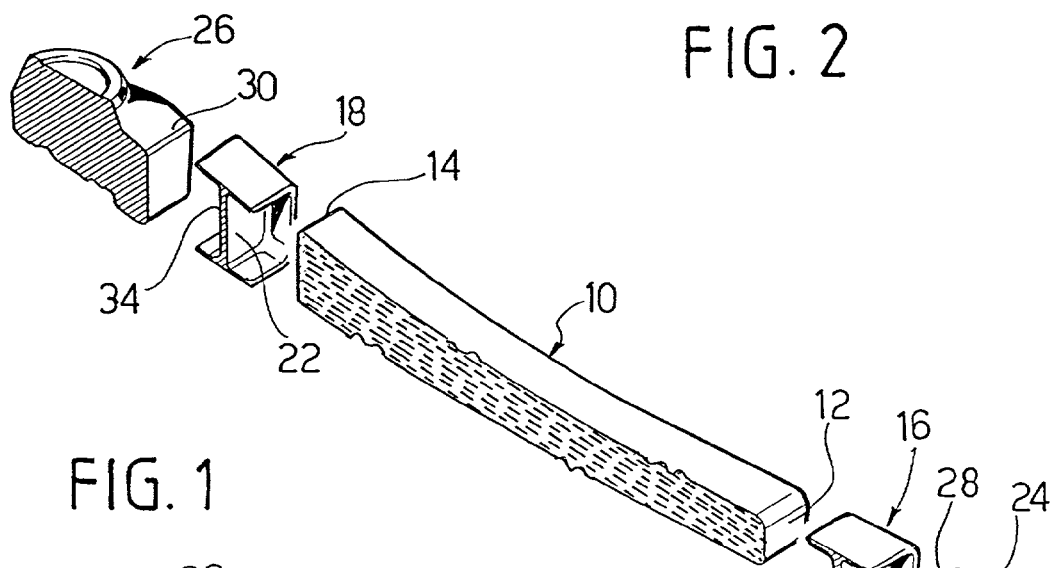

This invention relates to a bicycle crank and a method for manufacturing said crank.

More precisely, this invention relates to a bicycle crank comprising:

an elongated core with a first and a second end, a first and a second insert arranged on the ends of said core, and a high-resistance fibre coating incorporated in a plastic material matrix.

U.S. Pat. No. 6,202,506 describes a bicycle crank of the type specified above, wherein the inserts are foamed into a rigid plastic material forming the core of the crank. This document discloses a method for manufacturing a crank comprising the following steps: introducing into a mould one layer of fabric soaked in synthetic resin providing a partially open fibre-reinforced plastic casing, inserting a pair of inserts in the partially open casing, foaming the inserts with high-resistance foam, sealing the fibre-reinforced plastic material casing with at least one layer of fibre fabric soaked in plastic material, and hardening the fibre-reinforced plastic material and said foam.

SUMMARY

The object of the present invention is to provide a crank and a method for manufacturing said crank providing a simpler connection between the inserts and the core, which does not require foaming the inserts in the mould.

According to this invention, this object is attained by means of a crank and a manufacturing method having the characteristics forming the subject of the claims.

BRIEF DESCRIPTION OF THE DRAWING(S)

Figure 1:
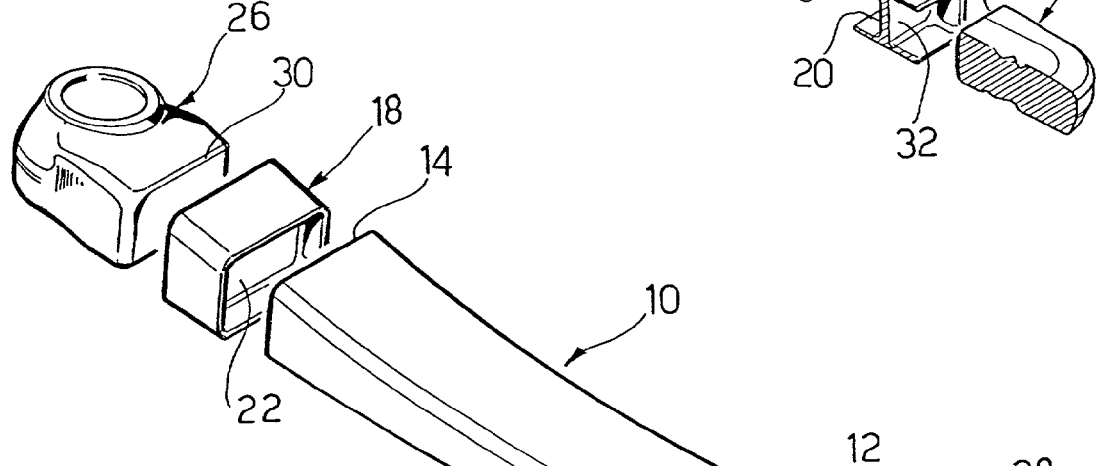
Figure 3:
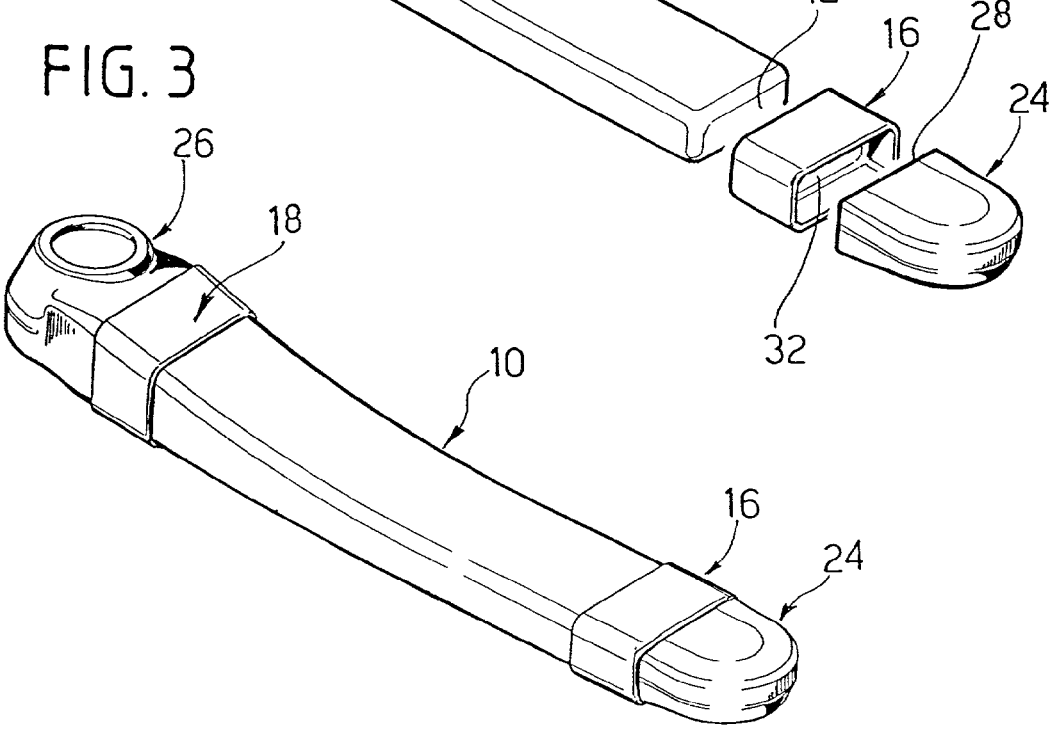
Figure 4:
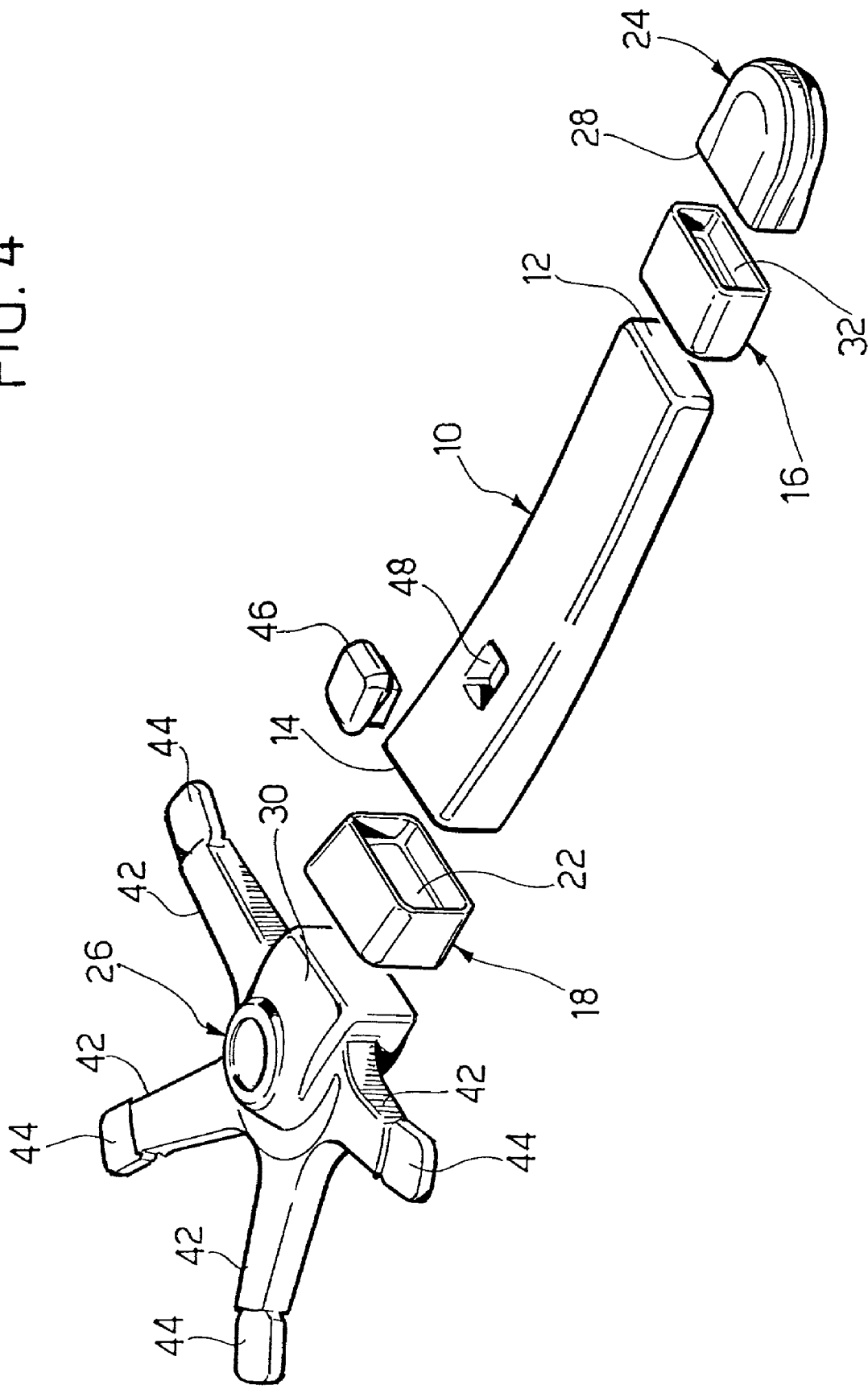
Figure 7:
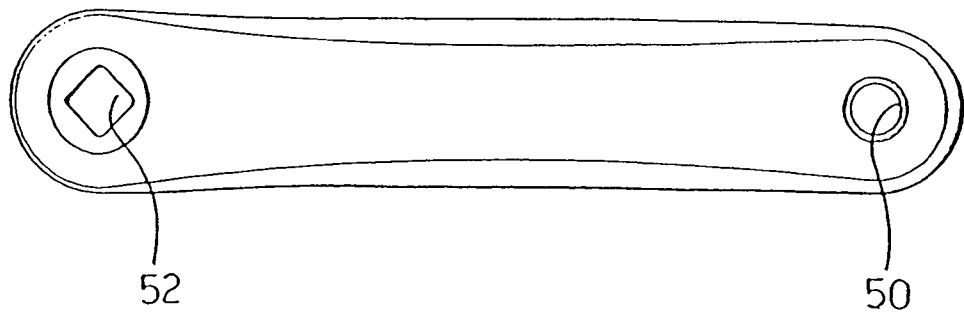
Figure 5:
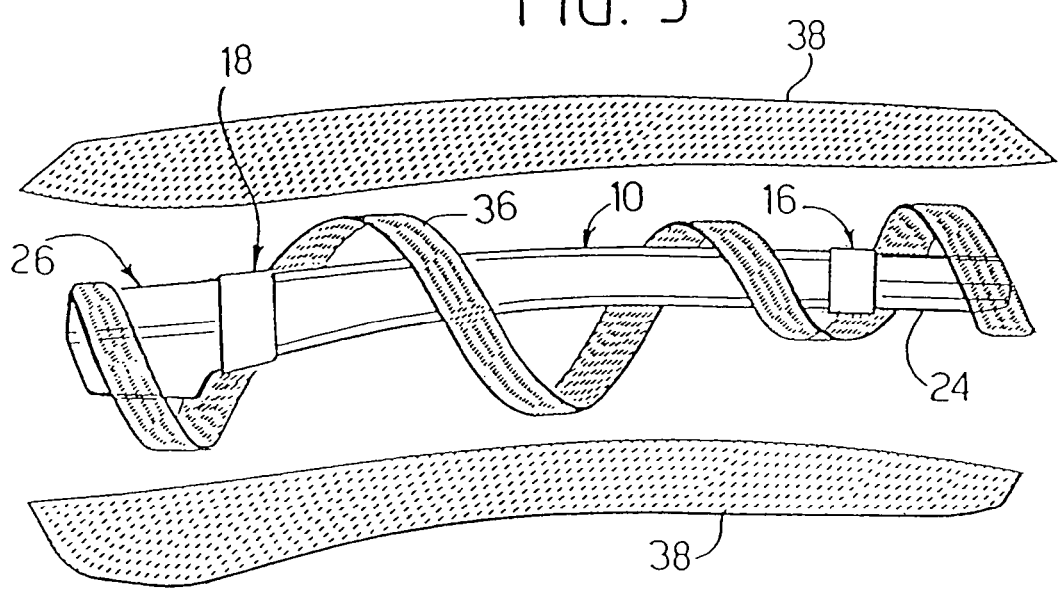
Figure 6:
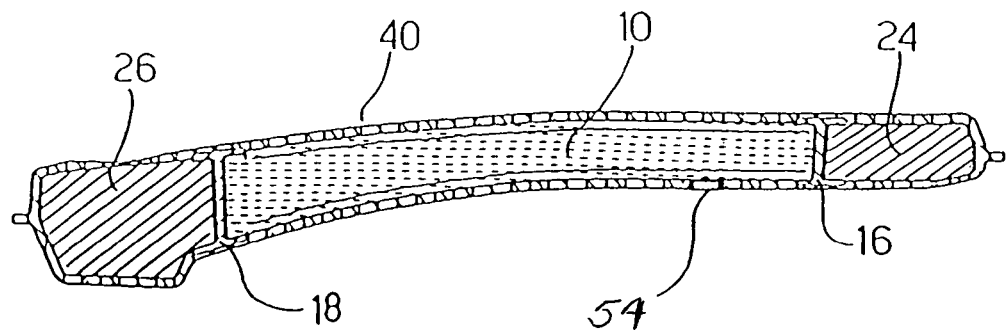

This invention will be better explained by the following detailed descriptions with reference to the accompanying Figures, given as non-limiting example, wherein:

FIG. 1 is a perspective view illustrating the components of a left crank according to this invention, FIG. 2 is a perspective longitudinal cross-section view of the components shown in FIG. 1, FIG. 3 is a perspective view illustrating the components of FIG. 1 in assembled configuration, FIG. 4 is a perspective exploded view illustrating the components of a right crank according to this invention, FIG. 5 schematically illustrates the lamination phase employing layers of carbon fibre for manufacturing a crank according to this invention, FIG. 6 is a longitudinal cross-section view of a crank according to this invention at the end of the lamination and carbon fibre polymerisation phase, and FIG. 7 is a top view of a finished crank.

DETAILED DESCRIPTION OF THE PREFERRED EMBODIMENT(S)

With reference to FIGS. 1 to 3, numeral 10 indicates a pre-formed foamed plastic material core, such as polyurethane or similar material, obtained by foaming in mould. Core 10 has an elongated shape and presents two ends 12, 14, to which respective union elements or couplings 16, 18 are connected; said union elements being provided with recesses 20, 22 for receiving the end portions 12, 14 of the core 10 and establishing a union therewith.

Numerals 24 and 26 indicate inserts, for example made of aluminium alloy, or fibre-reinforced plastic material, having end portions 28, 30 inserted into corresponding recesses 32, 34 of the union elements 16, 18 to establish a shaped coupling therewith. Preferably, inserts 24, 26 consist of solid metallic blocks. The inserts preferably include apertures 50, 52 for receiving the pedal spindle and the bottom bracket spindle, respectively, see FIG. 7.

FIG. 3 shows the arrangement formed by the core 10, the union elements 16, 18 and the inserts 24, 26 in assembled condition. The core 10 does not present structural characteristics, i.e., does not transfer force or torque between the inserts 24, 26. The core 10 locates the inserts 24, 26 in a predefined position and forms a supporting and contrast surface during the lamination and moulding phases schematically illustrated in FIGS. 5 and 6. The term "lamination" herein refers to the layering operations of the tapes 36 and the sheets 38 on the arrangement formed by the inserts 24, 26 and the core 10. This operation is used to direct the reinforcement fibres in the most suitable fashion to confer the required structural characteristics to the crank.

The arrangement shown in FIG. 3 is wrapped in tapes 36 and sheets 38 formed by structural high resistance fibres incorporated in a plastic material matrix. Preferably, the tapes and the sheets 36, 38 are made of carbon fibre fabric incorporated in a thermosetting resin. The structural fibres can be selected among carbon fibres, glass fibres, aramidic fibres, boron fibres, ceramic fibres or any combinations thereof. After lamination, the crank is subjected to moulding at a temperature either equal to or higher than the polymerisation temperature of the thermosetting resin. The moulding operation is carried out in a press mould (not shown). During moulding, the applied press pressure is resisted by the core and the inserts, and this pressure compacts the plastic material matrix fabric.

After moulding, the plastic material matrix is hardened. The crank removed from the mould appears as shown schematically in FIG. 6, with a homogenous carbon fibre casing 40 enclosing the core 10 and the inserts 24, 26. The casing 40 has high-resistance structural characteristics and is capable of transferring the stress to which the crank is subjected during use from one insert, 24 or 26, to the other.

The method described above with reference to the left crank is used similarly for manufacturing the right crank, as shown in FIG. 4. In this case, the insert 26 for connecting the bottom bracket is equipped with a set of integral metallic spokes 42. In the form of embodiment shown in FIG. 4, the insert 26 has four spokes 42, which ends 44 form points for fastening a pair of chain wheels (not shown). A fifth fastening point is obtained by means of a third metallic insert 46 housed in a recess 48 formed in the core 10. The crank shown in FIG. 4 is subjected to lamination and polymerisation in the mould similarly as described above.

Both in the case of the left crank and in the case of the right crank, the inserts are preferably subjected to further processing to form a threaded hole 50 for connecting a pedal spindle and a polygonal hole 52 for connecting a bottom bracket spindle after polymerisation in mould.

As stated previously, the core 10 does not contribute substantially to the structural resistance. The structural characteristic part of the crank being the casing 40, which presents a high-resistance and is capable of transferring the force and the torque between the inserts 24 and 26 during the use of the crank. The core 10 may be made of any material which sustain a form and a support to the structural fibres during moulding, such as foam, wax or resin.

In accordance with a more preferred embodiment of the present invention, the core 10 is removed after final formation of the structural fibre casing 40. The core of this embodiment can be formed by granular material, e.g. sand, mixed with a binding resin. The granular material can be extracted from the structural fibre casing 40 through a hole, illustrated at 54, after the hardening to form a unit comprised of the hollow casing 40 of structural fibres and the inserts 24 and 26.

In view of the above description it will be evident that the structural components crank in accordance with the present invention is formed by the casing of structural fibres and the inserts. These components of the crank, i.e. the components are what transmits a load during normal use of the crank.

Naturally, numerous changes can be implemented to the construction and forms of embodiment of the invention herein envisaged, all comprised within the context of the concept characterising this invention, as defined by the following claims.

What is claimed is:

1. Method of manufacturing a bicycle crank, characterised by comprising the following steps:
    a) providing an elongated core having opposed ends;
    b) providing a pair of inserts;
    c) providing a pair of couplers and joining said inserts to opposite ends of said elongated core;
    d) helically wrapping structural fibres incorporated in tapes of plastic material matrix around the elongated core, couplers and the inserts to enclose them;
    e) laminating a coating of structural fibres incorporated in a plastic material matrix onto the product of step d; and
    f) molding said plastic material matrix to form a hardened, high resistance rigid casing enclosing the product of step c.

2. Method according to claim 1 characterised in that it further comprises the step of removing the elongated core after hardening of said plastic material matrix.

3. Method according to claim 2 characterised in that a hole is provided in said hardened plastic material matrix and said elongated core is formed of a granular material which is extracted through said hole.

4. Method according to claim 1 characterised in that it comprises the step of applying a third insert in an intermediate area of said elongated core.

5. Method of manufacturing a bicycle crank comprising the following steps:
    a) providing an elongated core having first and second ends;
    b) positioning at least one coupling adjacent to at least one end of the core;
    c) positioning an insert adjacent to the coupling;
    d) helically wrapping structural fibres incorporated in tapes of plastic material matrix around the elongated core, at least one coupling and insert to enclose them;
    e) applying a laminate of fibrous structural plastic material to the core, the at least one coupling and the insert; and
    f) molding the plastic material to form a hardened structural casing enclosing the core, the at least one coupling and the insert to provide a structural connection between the inserts.

6. The method of claim 5 further comprising the step of removing substantially all of the core.

7. A bicycle crank comprising:
    an elongated core having first and second ends;
    a first insert positioned adjacent to the first end of the core;
    a second insert positioned adjacent the second end of the core helically wrapped by structural fibres incorporated in tapes of plastic material matrix and a hardened fibrous plastic material overlaying the wrapped core and the first and second inserts,
    wherein the inserts are held adjacent to the ends of the core by a respective coupling and the fibrous plastic material which provides a structural connection between the inserts.

8. The bicycle crank of claim 7, further comprising a third insert arranged in an intermediate area of said crank.

9. The bicycle crank of claim 7, wherein said structural fibres are chosen from the group consisting of carbon fibres, glass fibres, aramidic fibres, boron fibres, ceramic fibres and combinations thereof.

10. The bicycle crank of claim 7, wherein said inserts are metallic.

11. The bicycle crank of claim 10, wherein said inserts are made of an aluminum alloy.

12. The bicycle crank of claim 7, wherein said inserts are made of fibre-reinforced plastic material.

13. The bicycle crank of claim 7, wherein said elongated core is non-structural.

14. The bicycle crank of claim 7, wherein said elongated core is made of a material chosen from a group consisting of a foam, a wax and a resin.

15. The bicycle crank of claim 7, wherein said elongated core is a preformed body of foamed plastic material.

16. The bicycle crank of claim 7, wherein said elongated core has end portions configured to be received in recesses of the coupling for establishing a continuous shape including said coupling said inserts said elongated core.

17. A bicycle crank comprising:
    a non-structural elongated core having first and second ends;
    a first insert positioned adjacent to the first end of the core;
    a second insert positioned adjacent the second end of the core;
    a helical wrap of structural fibres incorporated in tapes of plastic material matrix around the elongated core and the inserts enclosing them; and
    a hardened fibrous plastic material that forms a structural connection between the inserts.

18. The bicycle crank of claim 17, further comprising a third insert arranged in an intermediate area of said crank.

19. The bicycle crank of claim 17, wherein said structural fibres are chosen from the group consisting of carbon fibres, glass fibres, aramidic fibres, boron fibres, ceramic fibres and combinations thereof.

20. The bicycle crank of claim 17, wherein said inserts are metallic.

21. The bicycle crank of claim 17, wherein said inserts are made of an aluminum alloy.

22. The bicycle crank of claim 17, wherein said inserts are made of fibre-reinforced plastic material.

23. The bicycle crank of claim 17, wherein said elongated core is made of a material chosen from a group consisting of a foam, a wax and a resin.

24. The bicycle crank of claim 17, wherein said elongated core is a preformed body of foamed plastic material.

25. The bicycle crank of claim 17, wherein said elongated core has end portions configured to be received in recesses of the coupling for establishing a continuous shape including said coupling, said inserts and said elongated core.

* * * * *